Jan. 15, 1924.

T. BERRY 1,480,876

AGRICULTURAL IMPLEMENT

Original Filed July 19, 1922

Inventor
Terrie Berry

By Zoltan Polacheck
Attorney

Patented Jan. 15, 1924.

1,480,876

UNITED STATES PATENT OFFICE.

TERRIE BERRY, OF MOUNT HOPE, NEW JERSEY.

AGRICULTURAL IMPLEMENT.

Application filed July 19, 1922, Serial No. 575,953. Renewed December 6, 1923.

*To all whom it may concern:*

Be it known that I, TERRIE BERRY, a citizen of Czechoslovakia, residing at Mount Hope, in the county of Morris and State of New Jersey, have invented certain new and useful Improvements in Agricultural Implements, of which the specification has been filed on July 19, 1922, under Serial No. 575,953.

This invention relates generally to agricultural implements, having particular reference to a power driven plow with which is combined a seed planter.

The invention has for an object to provide a novel agricultural implement having improved means for adjusting the plow.

For further comprehension of the invention, and of the objects and advantages thereof, references will be had to the following description and accompanying drawings, and to the appended claims in which the various novel features of the invention are more particularly set forth.

Fig. 1 of the the drawings is a plan view of an agricultural implement embodying my invention.

Figure 1:
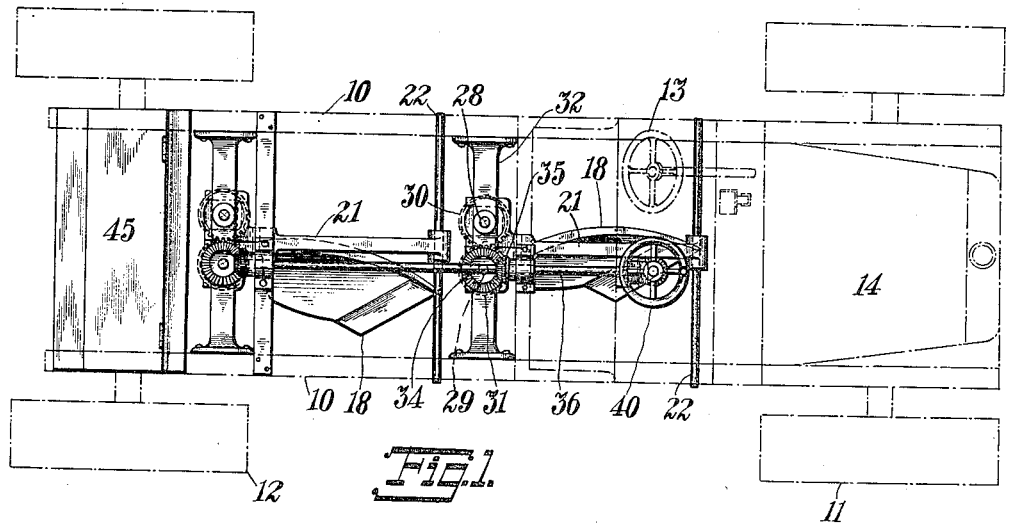

As here shown my improved plow comprises a frame made up of the side bars 10 suitably braced to one another. This frame is mounted on front wheels 11 and rear wheels 12, the front wheels being adapted for steering by a wheel 13 in the usual manner, while the rear wheels may be driven from a gasoline engine 14, on the front of the frame, by any suitable transmission mechanism, not shown. Or any type of draft gear may be attached to the frame. Suitably positioned behind the engine 14 is a seat 15 for the driver.

Figure 2:
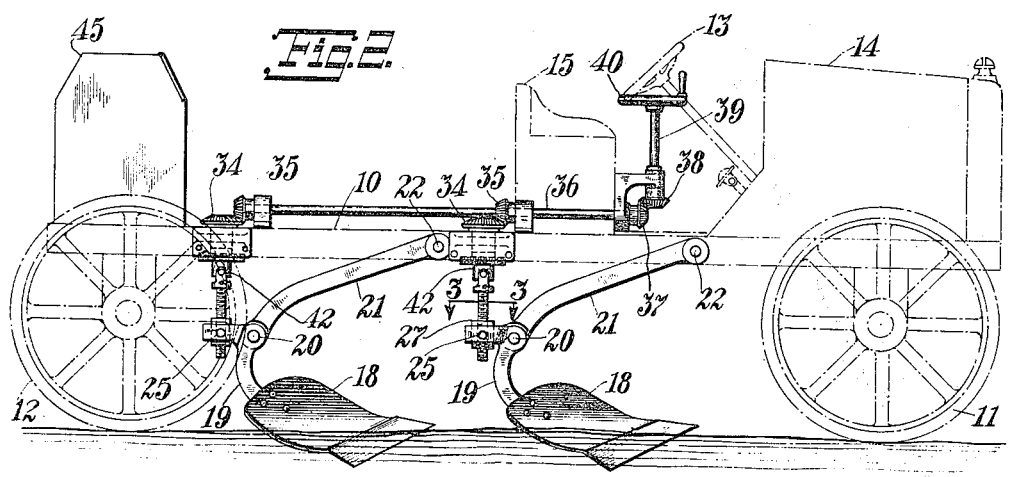
Fig. 2 is a side view thereof.
Figure 3:
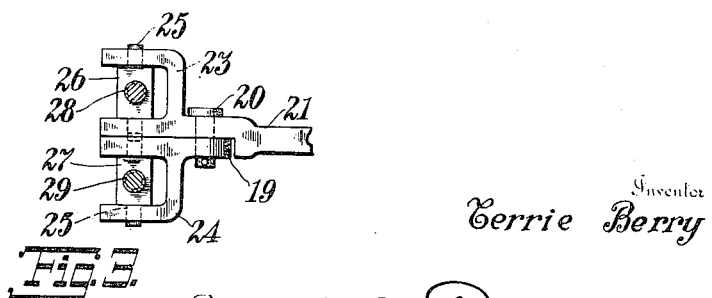
Fig. 3 is a fragmentary horizontal section on the line 3—3 of Fig. 1.

In connection with my improved machine I may either employ a single plow, as in Fig. 1 or a pair of plows, as indicated in Fig. 2.

Each plow comprises an ordinary moldboard 18 fixed to a curved bar 19, the latter being pivoted on a horizontal axis as at 20 to, and forming an extension of, an arm 21 extending rearwardly and downwardly from a cross rod 22 extending between the frame pieces 10, the arm 21 being pivotally attached to this rod to swing vertically.

In connection with the plow I provide a means for raising and lowering the same by swinging it around the pivot rod 22, while maintaining the horizontal positioning of the moldboard 18. To this end the arm 21 and curved bar 19 have integral forked fingers 23 and 24 respectively, extending rearwardly from their connection point 20, and in the forks of these fingers are pivotally mounted as by the trunnions 25, nuts 26 and 27 through which are threaded the screw shafts 28 and 29, the latter having meshing gears 30 and 31 respectively fixed thereon, these shafts being suitably supported by a bearing element 32 extending between the frame bars 10.

Upon the upper end of shaft 29 is a bevel gear 34 meshing with a bevel gear 35 on the rear end of a horizontal shaft 36. Upon the forward end of this shaft is a second bevel gear 37 meshing with a like gear 38 on a short vertical shaft 39 having a handwheel 40 on its upper end adjacent the driver's seat 15. As will be apparent, when the handwheel 40 is rotated, the screw shafts 28, 29 will be likewise rotated, the relative pitches of the two threads being calculated to cause a differential movement of the finger 24 on the moldboard support sufficient to cause the moldboard to maintain approximately the same angular positioning as the plow is adjusted to plow to different depth in the soil. The shafts 28, 29 have universal joints such as 42 therein.

On the back of the frame I mount a seed planter 45 of any approved construction and adapted to be operated in the usual manner from the rear shaft.

While I have illustrated and described a preferred embodiment of my invention it is to be understood that I do not limit myself to the precise details of construction herein set forth and the right is reserved to all changes and modifications coming within the spirit and scope of the invention as defined in the appended claims.

Having thus described my invention what I claim as new and desire to protect by Letters Patent of the United States is as follows:—

1. An agricultural implement comprising a frame, an arm hinged thereto, a plow element hinged in turn to the free end of the arm, said arm and plow element being each hinged for vertical adjustment, and a unitary means for simultaneously swinging the arm and plow element on their respective hinge axes, said unitary means including a pair of screws of relatively varying pitch having threaded engagement with the arm and plow element respectively, and a common operating element adapted to rotate said screws in unison.

2. An agricultural implement comprising a frame, an arm hinged to said frame, a plow element pivotally attached to said arm, said arm and plow element having rearwardly extending forked fingers, nuts pivoted in said forked fingers, threaded shafts engaged with said nuts, universal joints in said threaded shafts, and a unitary operating means for said threaded shafts.

In testimony whereof I have affixed my signature.

TERRIE BERRY.